US012560157B2

(12) United States Patent
Kawazoe et al.

(10) Patent No.: US 12,560,157 B2
(45) Date of Patent: Feb. 24, 2026

(54) SEALED COMPRESSOR

(71) Applicant: FUJITSU GENERAL LIMITED, Kanagawa (JP)

(72) Inventors: Shoji Kawazoe, Kanagawa (JP); Akira Inoue, Kanagawa (JP); Shingo Yahaba, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 0 days.

(21) Appl. No.: 18/844,709

(22) PCT Filed: Feb. 24, 2023

(86) PCT No.: PCT/JP2023/006876
§ 371 (c)(1),
(2) Date: Sep. 6, 2024

(87) PCT Pub. No.: WO2023/181785
PCT Pub. Date: Sep. 28, 2023

(65) Prior Publication Data

US 2025/0237209 A1 Jul. 24, 2025

(30) Foreign Application Priority Data

Mar. 24, 2022 (JP) ................................ 2022-049121

(51) Int. Cl.
*F04B 39/12* (2006.01)
*F04C 29/00* (2006.01)

(52) U.S. Cl.
CPC ............ *F04B 39/127* (2013.01); *F04B 39/12* (2013.01); *F04C 29/00* (2013.01); *F05D 2230/232* (2013.01)

(58) Field of Classification Search
CPC ........ F04B 39/127; F04B 39/12; F04C 29/00; F05D 2230/232
See application file for complete search history.

(56) References Cited

U.S. PATENT DOCUMENTS 4,946,351 A * 8/1990 Richardson, Jr. ..... F01C 21/007 248/27.3
6,651,458 B1 * 11/2003 Ebara ................. F04C 18/3564 62/84

(Continued)

FOREIGN PATENT DOCUMENTS

CN 100455795 C 1/2009
JP S61-043982 A 3/1986

(Continued)

*Primary Examiner* — Hoang M Nguyen
(74) *Attorney, Agent, or Firm* — Paratus Law Group, PLLC

(57) ABSTRACT

A sealed compressor includes a base member that is welded to a compressor main body container and that supports the compressor main body container. The compressor main body container includes a bottom shell. The base member includes a mounting surface on which the bottom shell is mounted. At the center of the mounting surface, an opening is formed into which the central part of the bottom shell is fit. The base member is joined to the bottom shell by a plurality of welding spots formed at intervals in the circumferential direction of the opening. The plurality of welding spots are formed to extend for a predetermined length in the circumferential direction of the opening and are positioned in between the outer peripheral border of the mounting surface and the opening rim of the opening.

11 Claims, 9 Drawing Sheets

(56) References Cited

U.S. PATENT DOCUMENTS

| | | | | |
|---|---|---|---|---|
| 10,550,843 | B2 * | 2/2020 | Tanaka | F04C 18/07 |
| 2009/0293534 | A1 * | 12/2009 | Tanaka | F04C 29/026<br>62/470 |
| 2023/0076038 | A1 | 3/2023 | Akimoto et al. | |

FOREIGN PATENT DOCUMENTS

| | | | |
|---|---|---|---|
| JP | S64-013284 | U | 1/1989 |
| JP | H09-329081 | A | 12/1997 |
| JP | H10-037885 | A | 2/1998 |
| JP | H11-324922 | A | 11/1999 |
| JP | 2013-019302 | A | 1/2013 |
| JP | 2014-100718 | A | 6/2014 |
| JP | 2014-140873 | A | 8/2014 |
| JP | 6897811 | B1 | 7/2021 |

* cited by examiner

SEALED COMPRESSOR

CROSS REFERENCE TO PRIOR APPLICATION

This application is a National Stage Patent Application of PCT International Patent Application No. PCT/JP2023/006876 (filed on Feb. 24, 2023) under 35 U.S.C. § 371, which claims priority to Japanese Patent Application No. 2022-049121 (filed on Mar. 24, 2022), which are all hereby incorporated by reference in their entirety.

FIELD

The present invention relates to a sealed compressor.

BACKGROUND

As a sealed compressor, a compressor is known in which a compressing section for compressing a refrigerant and a motor for driving the compressing section are disposed inside a compressor main body container that is supported by a base member. In this type of sealed compressors, the base member has a mounting surface on which the bottom shell of the compressor main body container is mounted; the central part of the bottom shell of the compressor main body container is fit into an opening formed in the center of the mounting surface; and the bottom shell and the base member are joined by means of welding.

CITATION LIST

Patent Literature

[Patent Literature 1] Japanese Patent No. 6897811

SUMMARY

Technical Problem

In the base member, on the rim of the opening, a plurality of welding spots is formed at intervals along the circumferential direction of the rim of the opening. At the time of performing welding, due to the heat applied to the welding spots, the portions present between the neighboring welding spots undergo deformation along the rim of the opening. Because of such deformation occurring in the base member, there is a risk of formation of a gap between the bottom shell of the compressor main body container and the mounting surface of the base member. In case a gap is formed between the bottom shell and the mounting surface of the base member, the base member becomes prone to vibration, Hence, accompanying the vibration of the compressor main body container during the operation of the sealed compressor, the base member undergoes sympathetic vibration in the portion in which the gap is formed, That results in an increase in the noise attributed to the sympathetic vibration.

The technology disclosed herein is developed in view of the issues explained above, and it is an objective to provide a sealed compressor in which, during the welding of the base member and the compressor main body container, it becomes possible to hold down deformation of the portions present between the neighboring welding spots formed on the base member.

Solution to Problem

According to an aspect of an embodiments in the present application, a sealed compressor includes; a compressor main body container that is vertically cylindrical in shape; a compressing section that is placed inside the compressor main body container and that compresses a refrigerant; and a motor that is placed inside the compressor main body container and that drives the compressing section, wherein the sealed compressor further comprises a base member that is welded to the compressor main body container and that supports the compressor main body container, the compressor main body container includes a bottom shell, the base member includes a mounting surface on which the bottom shell is mounted, at center of the mounting surface, an opening is formed into which central part of the bottom shell is fit, the base member is joined to the bottom shell by a plurality of welding spots formed at intervals in circumferential direction of the opening, and the plurality of welding spots are formed to extend for a predetermined length in circumferential direction of the opening and are positioned in between outer peripheral border of the mounting surface and opening rim of the opening.

Advantageous Effects of Invention

According to one aspect of the sealed compressor disclosed in the application concerned, during the welding of the base member and the compressor main body container, it becomes possible to hold down deformation of the portions present between the neighboring welding spots formed on the base member. As a result, it becomes possible to hold down the occurrence of gaps in the welding spots formed between the base member and the compressor main body container. That enables holding down an increase in the noise attributed to the sympathetic vibration of the base member accompanying the vibration of the compressor main body container.

DESCRIPTION OF EMBODIMENTS

Exemplary embodiments of a sealed compressor according to the application concerned are described in detail with reference to the accompanying drawings. However, the sealed compressor according to the application concerned is not limited by the embodiments described below.

First Embodiment (Structure of Rotary Compressor)

Figure 1:
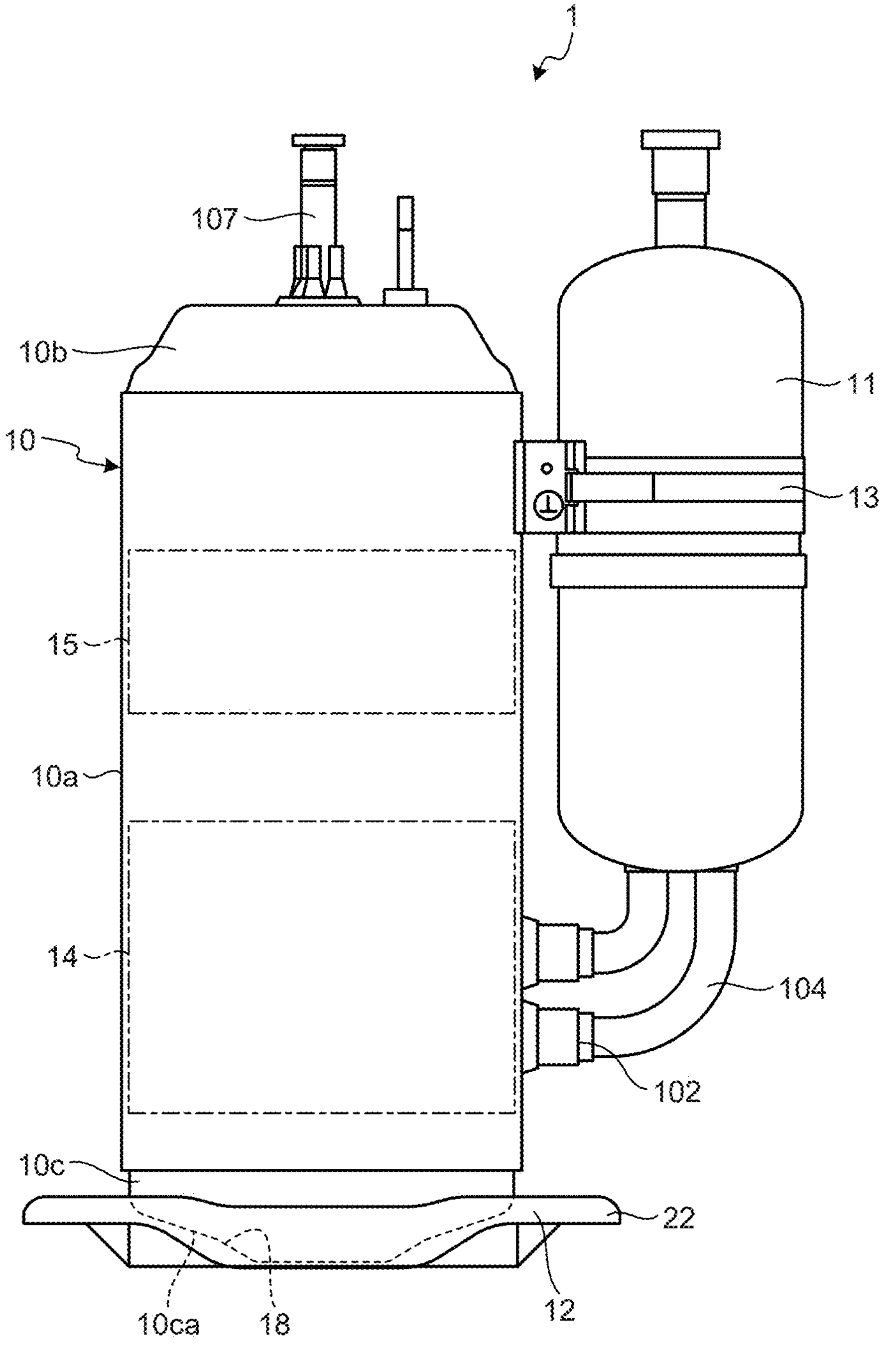
FIG. 1 is an external appearance diagram of a rotary compressor according to a first embodiment.

FIG. 1 is an external appearance diagram of a rotary compressor according to a first embodiment. As illustrated in FIG. 1, the rotary compressor 1 includes a compressor main body container 10 that is vertically cylindrical in shape, an accumulator 11, and a base member 12 that supports the compressor main body container 10. Inside the vertically-cylindrical compressor main body container 10, a compressing section 14 is housed that takes in a refrigerant from the accumulator 11 through a compressing-section suction pipe 102 and a communication pipe 104, and discharges the compressed refrigerant to the inside of the compressor main body container 10; and a motor 15 is housed that drives the compressing section 14. The rotary compressor 1 is an internal-high-pressure-type sealed compressor in which the high-pressure refrigerant, which has been compressed by the compressing section 14, is discharged to the inside of the compressor main body container 10 and is further discharged through a discharge pipe 107.

As illustrated in FIG. 1, the compressor main body container 10 includes a cylindrical main shell 10*a*, a cup-shaped top shell 10*b*, and a cup-shaped bottom shell 10*c*. The main shell 10*a*, the top shell 10*b*, and the bottom shell 10*c* of the compressor main body container 10 are made of a metallic material. In the compressor main body container 10, the top shell 10*b* is welded to the upper end portion of the main shell 10*a*, and the bottom shell 10*c* is welded to the lower end portion of the main shell 10*a*. The accumulator 11 is fixed to the main shell 10*a* of the compressor main body container 10 using a metal fixture 13. To the bottom shell 10*c* of the compressor main body container 10, the base member 12 is welded.

(Structure of Base Member and Bottom Shell)

Figure 2:
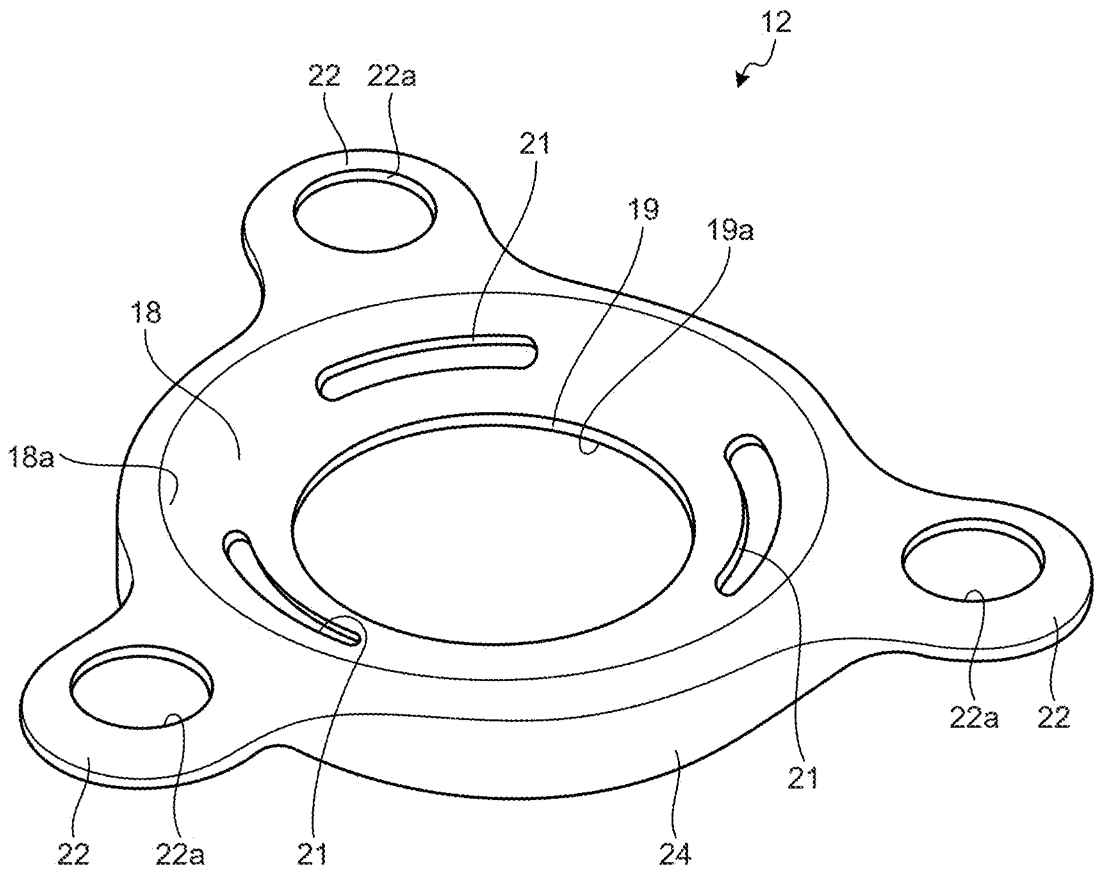
FIG. 2 is a top perspective view of a base member that is included in the rotary compressor according to the first embodiment.
Figure 3:
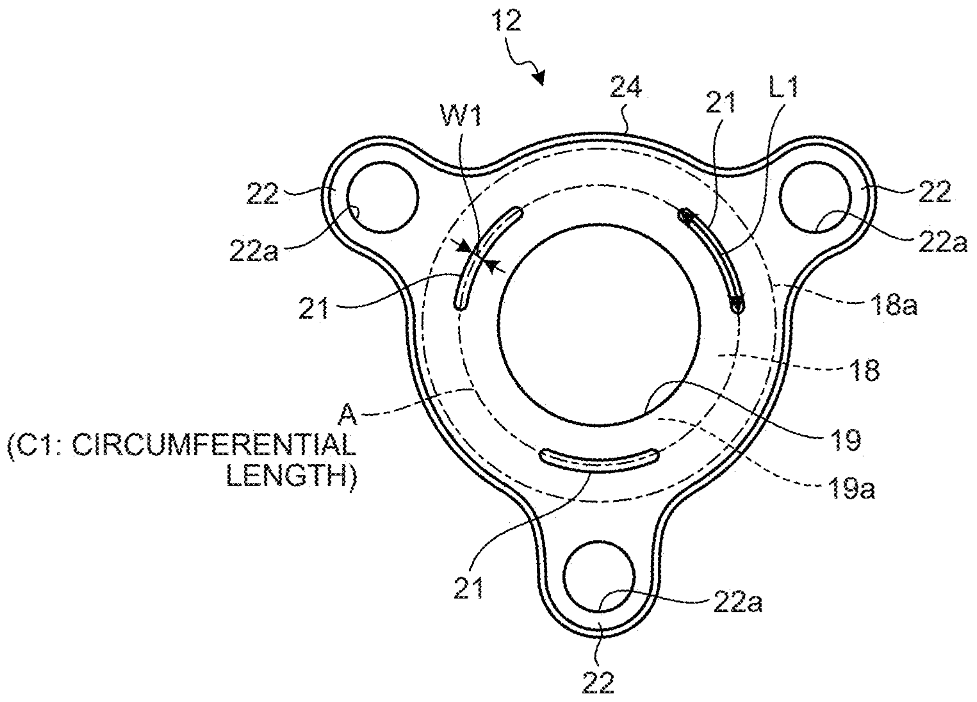
FIG. 3 is a bottom planar view of the base member according to the first embodiment.
Figure 4:
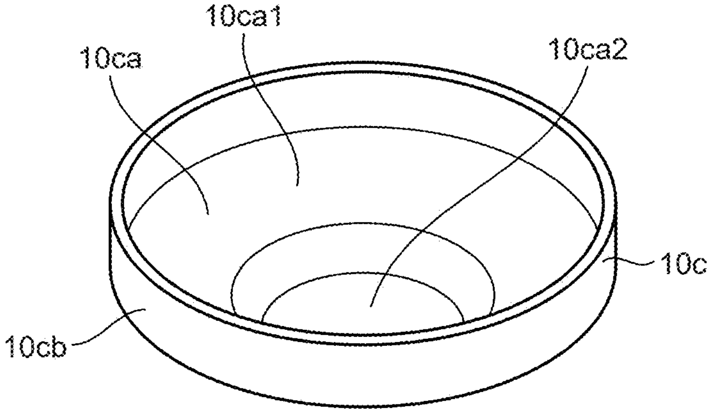
FIG. 4 is a top perspective view of a bottom shell according to the first embodiment.
Figure 5:
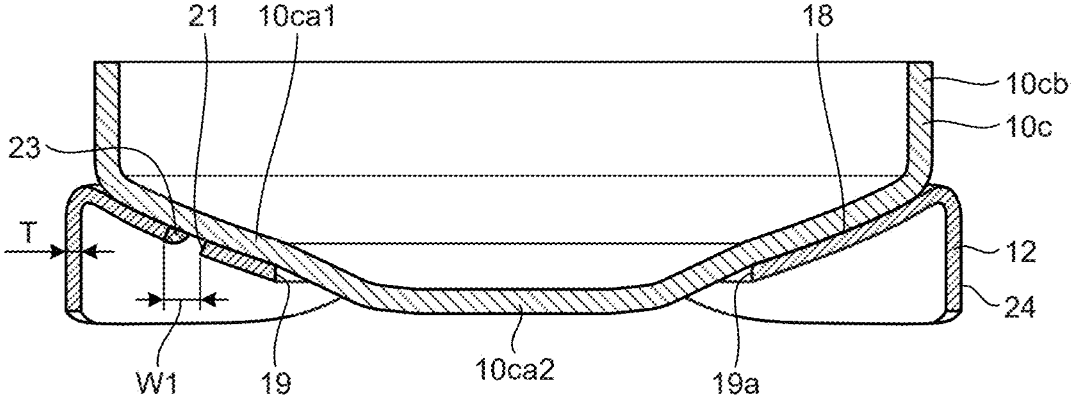
FIG. 5 is a cross-sectional view of the joint between the bottom shell and the base member according to the first embodiment.

FIG. 2 is a top perspective view of the base member 12 that is included in the rotary compressor 1 according to the first embodiment. FIG. 3 is a bottom planar view of the base member 12 according to the first embodiment. FIG. 4 is a top perspective view of the bottom shell 10*c* according to the first embodiment. FIG. 5 is a cross-sectional view of the joint between the bottom shell 10*c* and the base member 12 according to the first embodiment.

As illustrated in FIGS. 2, 3, and 5, the base member 12 according to the first embodiment is formed in a vertically-flipped saucer-like shape and is manufactured by, for example, stamping a metallic material having the thickness of T [mm]. The base member 12 includes a mounting surface 18, an opening 19, and legs 22, When the bottom shell 10*c* of the compressor main body container 10 is mounted on the mounting surface 18, the base member 12 supports the compressor main body container 10 from below. The mounting surface 18 is formed along a bottom face 10*ca* (a contact face 10*ca*1) of the bottom shell 10*c* (explained later). As a result, it becomes possible to prevent the formation of a gap between the bottom shell 10*c* and the mounting surface 18 of the base member 12. In the first embodiment, the mounting surface 18 is formed to have a roughly toric shape due to the opening 19 formed in the center, and is gently inclined downward in the direction of the center of the opening 19. When the mounting surface 18 of the base member 12 and the bottom shell 10*c* come in contact with each other, the bottom shell 10*c*, mounted on the mounting surface 18, can be supported by the entire mounting surface 18, thereby enabling holding down the vibration occurring in the base member 12. Moreover, in the base member 12, an outer-periphery-side rising portion 24, which extends from the outer peripheral border of the base member 12 along the direction of the central axis of the opening 19, is formed. That results in the enhancement of the mechanical strength of the base member 12.

As illustrated in FIGS. 2 to 5, the circular opening 19 is formed in the center of the mounting surface 18 of the base member 12. Into the opening 19 of the base member 12, a fitting portion 10*ca*2, which is formed in the central part of the bottom face 10*ca* of the bottom shell 10*c* (explained later), is fit. In the compressor main body container 10, when the fitting portion 10*ca*2 of the bottom face 10*ca* of the bottom shell 10*c* (explained later) is fit into the opening 19 on the mounting surface 18, the bottom shell 10*c* gets positioned at a predetermined position with respect to the mounting surface 18. In the first embodiment, the contact face 10*ca*1 of the bottom face 10*ca* of the bottom shell 10*c* (explained later) comes in contact with an opening rim 19*a* of the opening 19 formed in the base member 12.

As illustrated in FIGS. 1, 4, and 5, the bottom shell 10*c* of the compressor main body container 10 is formed to have a U-shaped cross-sectional surface (i.e., formed to have a cup shape). According to the embodiment, the bottom shell 10*c* includes the bottom face 10*ca* that is roughly disc-shaped and that includes a cylindrical portion extending upward from the outer periphery of the bottom face 10*ca*. The bottom face 10*ca* of the bottom shell 10*c* is gently inclined downward in the direction of the center thereof. Moreover, the bottom face 10*ca* of the bottom shell 10*c* includes the contact face 10*ca*1 that is placed on the mounting surface 18 of the base member 12, and includes the fitting portion 10*ca*2 that is fit into the opening 19 of the base member 12. The fitting portion 10*ca*2 slightly protrudes downward so that the outside face thereof comes in contact with the opening rim 19*a* of the opening 19 of a base member 12*a*.

(Slits)

On the mounting surface 18 of the base member 12, a plurality of slits 21 is formed that extends in the circumferential direction of the opening 19. The slits 21 are through holes that penetrate the mounting surface 18 of the base member 12 from the top face to the bottom face. The slits 21 are formed at intervals on the same circumference along the circumferential direction of the opening 19. In the first embodiment, three slits 21 are positioned on a circumference A (a circle A) that is positioned in a radial direction of the mounting surface 18 and in between an outer peripheral border 18*a* of the mounting surface 18 and the opening rim 19*a* of the opening 19. More particularly, in the first embodiment, the circumference A is a circle passing near the midpoint of a line segment joining the outer peripheral border 18*a* of the mounting surface 18 and the opening rim 19*a* in a radial direction; and the three slits 21 are formed on that circumference A. Moreover, the slits 21 are formed at regular intervals with respect to the circumferential direction of the circumference A, Meanwhile, neither the positions of the slits 21 in a radial direction of the mounting surface 18 are limited to the explanation given above, nor the number of slits 21 is limited to the explanation given above. For example, the circumference A, on which the slits 21 are formed, can be shifted to one side in a radial direction with respect to the circumference passing through the center of the portion present between the outer peripheral border 18*a* and the opening rim 19*a* in a radial direction of the mounting surface 18. Moreover, the number of slits can be equal to or greater than four.

Each slit 21 extends in an arc-like manner along the circumference A that runs along the circumferential direction of the opening 19. In the first embodiment, when viewed from the position of the central point of the circumference A on the central axis passing through the center of the opening 19, the slits 21 are positioned to overlap with the legs 22 (explained later) in the circumferential direction. Meanwhile, the positions and the shapes of the slits 21 are not limited to the explanation given above.

In the direction orthogonal to the circumference A that runs along the circumferential direction of the opening 19, each of the three slits 21 has a slit width W1 [mm] (in the first embodiment, the slit width W1 [mm] in a radial direction of the opening 19) to be equal to or greater than 1.5 times a thickness T [mm] of the mounting surface 18 of the base member 12. That is, $W1 \geq 1.5 \times T$ holds true. As a result, at the time of forming welding spots 23 (explained later), when the electrode of a welding torch (not illustrated) is moved closer to the contact portions between the bottom shell 10*c* and the mounting surface 18 of the base member 12 via the slits 21, the electrode of the welding torch can be prevented from colliding with the rim portion of the slits 21, thereby making it easier to form the welding spots 23. In the first embodiment, as an example, the slit width W1 of the slits 21 is set to be about 1.7 times the thickness T of the base member 12 at the mounting surface 18.

When L2 represents the length of a plurality of welding spots 23 (explained later) in the circumferential direction (hereinafter, referred to as the welding length), a slit length L1 of the opening 19 in the circumferential direction is equal to or greater than the length L2 (see FIG. 6). Herein, the slit length 11 of each slit 21 is defined as the length of the arc joining both ends of that slit 21 in the circumferential direction; and the welding length L2 of each welding spot 23 is defined as the length of the arc joining both ends of that welding spot 23 in the circumferential direction. Alternatively, the slit length 11 of each slit 21 can be defined as the direct distance between both ends of that slit 21 in the circumferential direction; and the welding length 12 of each welding spot 23 can be defined as the direct distance between both ends of that slit 21 in the circumferential direction.

Since the slit length 11 and the welding length 12 satisfy the relationship $L1 > L2$ as explained above, at the time of performing welding using the welding spots 23 (explained later), for example, when the electrode of the welding torch (not illustrated) during arc welding is moved closer to the contact portions between the bottom shell 10*c* of the compressor main body container 10 and the mounting surface 18 of the base member 12, the electrode of the welding torch can be prevented from colliding with the rim portion of the slits 21. That is, the slit length 11 of the slits 21, on which the welding spots 23 are formed, is set to be greater (longer) than the welding length L2, while securing sufficient welding length 12 for maintaining the welding strength at the welding spots 23. That enables achieving improvement in the welding activity. Moreover, the welding spots 23 are formed by avoiding the edges at both ends of the slits 21 at which the electrode of the welding torch is at the risk of not being able to pass through. Hence, it becomes possible to appropriately form the welding spots 23 in such a way that the mounting surface 18 of the base member 12 and the bottom shell 10*c* of the compressor main body container 10 are linked. As a result, it becomes possible to avoid variability in the joint strength between the bottom shell 10*c* and the base member 12 using the welding spots 23.

On the outer periphery of the base member 12, the three legs 22 are formed in an integrated manner. The three legs 22 are formed to be continuous from the toric mounting surface 18 and to extend outward in a radial direction of the opening 19. Moreover, the three legs 22 are placed at regular intervals in the circumferential direction of the opening 19. Each leg 22 has an elastic member (not illustrated) attached thereto and is thus supported on an installation surface (not illustrated) via the elastic member. For example, on each leg 22, an attachment hole 22*a* is formed through the base member 12 so that the upper end of the elastic member (not illustrated) can be fit into the attachment hole 22*a*. As the elastic member, for example, a columnar rubber material is used.

(Welding Spots)

Figure 6:
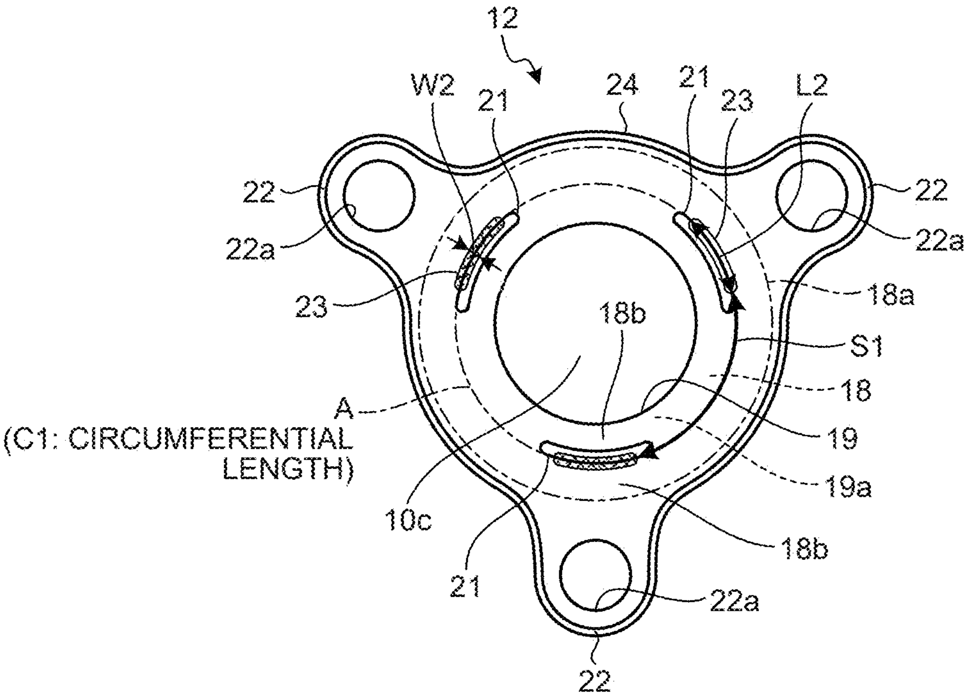
FIG. 6 is a planar view of welding spots formed on the base member according to the first embodiment.

FIG. 6 is a planar view, when viewed from below the base member 12, of the welding spots 23 formed on the base member 12 according to the first embodiment. As illustrated in FIGS. 5 and 6, in the first embodiment, for example, the welding spots 23 are formed using arc welding via the slits 21 in such a way that the mounting surface 18 of the base member 12 and the bottom shell 10*c* are linked together. Because of a plurality of welding spots 23 extending up to a predetermined length in the circumferential direction, the bottom shell 10*c* of the compressor main body container 10 and the base member 12 are joined together.

In an identical manner to the arrangement of the three slits 21, three welding spot 23 are positioned in a radial direction of the mounting surface 18 and in between the outer peripheral border 18*a* of the mounting surface 18 and the opening rim 19*a* of the opening 19. More particularly, the three welding spots 23 are formed at regular intervals with respect to the circumferential direction of the circumference A that is present in between the outer peripheral border 18*a* and the opening rim 19*a* in a radial direction. Since the welding spots 23 are formed in between the outer peripheral border 18*a* of the mounting surface 18 and the opening rim 19*a* of the opening 19; on both sides of the mounting surface 18 sandwiching the welding spots 23 in a radial direction, portions 18*b* of the mounting surface 18 can be secured. As a result, any deformation occurring around the welding spots 23 (the slits 21) of the base member 12 due to the heat applied during welding can be effectively held down due to the stiffness of the base member 12 itself in the portions 18*b* secured on both sides of the welding spots 23 (the slits 21). For that reason, it becomes possible to hold down deformation around the welding spots 23 accompanying the welding. Thus, because of the welding spots 23, the bottom face of the bottom shell 10*c* of the compressor main body container 10 and the mounting surface 18 of the base member 12 can be joined without any gaps. That enables holding down the occurrence of a peculiar phenomenon in which, when there are gaps between the bottom face of the bottom shell 10*c* and the mounting surface 18 of the base member 12, the base member 12 undergoes sympathetic vibration accompanying the vibration of the compressor main body container 10. Consequently, it becomes possible to hold down the occurrence of the noise attributed to the sympathetic vibration of the base member 12.

Meanwhile, in the first embodiment, there is no restriction on the positions at which the welding spots 23 are formed on the mounting surface 18 in a radial direction. That is, as long as the welding spots 23 (the slits 21) are formed in between the outer peripheral border 18*a* of the base member 12 and the opening rim 19*a* of the opening 19, it serves the purpose. Moreover, in the first embodiment, there is no restriction on the number of welding spots 23. Thus, there can be two welding spots 23 or there can be four or more welding spots 23. Furthermore, in the first embodiment, the welding spots 23 (the slits 21) are formed at the positions overlapping with the legs 22 in a radial direction. However, there is no restriction on the positions of the welding spots 23. Thus, the welding spots 23 can alternatively be formed at positions not overlapping with the legs 22 in a radial direction.

When the base member 12 is viewed from below, each welding spot 23 makes contact with at least some part of the rim portion of the corresponding slit 21, More particularly, each welding spot 23 is formed in such a way that the rim portion of the corresponding slit 21 on the mounting surface 18 of the base member 12 is linked to that portion of the bottom shell 10*c* which overlaps with the concerned slit 21 when viewed in the axial direction. Thus, as a result of forming the welding spots 23 via the slits 21, the bottom shell 10*c* is joined to the mounting surface 18 of the base member 12. In the first embodiment, the welding spots 23 are formed to make contact with the rim portion on the outer periphery side of the slits 21 on the mounting surface 18. Meanwhile, when the welding spots 23 are formed via the slits 21, as long as the welding spots 23 make contact with at least either the rim portion on the inner periphery side or the rim portion on the outer periphery side of the slits 21 on the mounting surface 18, it serves the purpose. For example, the welding spots 23 can be formed to make contact with the rim portion only on the inner periphery side of the slits 21 on the mounting surface 18. Alternatively, as explained later in a third embodiment, the welding spots 23 can be formed to make contact with the rim portion on the inner periphery side as well the rim portion on the outer periphery side of the slits 21 on the mounting surface 18.

Each welding spot 23 is formed to extend for a predetermined length in the circumferential direction of the opening 19. Herein, the length of the arc joining both ends of each welding spot 23 along the circumferential direction of the opening 19 is set to be equal to the welding length 12 of the welding spots 23. Moreover, assume that C1 represents the circumferential length of the circle (the circumference A) passing through the slits 21 in a radial direction of the mounting surface 18. In the first embodiment, the arcs representing the welding length 12 are positioned to concyclically overlap with the circumference A. At that time, it is desirable that the welding length 12 of the welding spots 23 has the ratio to be equal to or greater than 5 [%] with respect to the circumferential length C1 of the circumference A running along the circumferential direction of the opening 19 (i.e., it is desirable that 12/C1≥0.05 holds true). With that, the welding spots 23 are formed to have the welding length L2 that is sufficient for preventing wobbling in the circumferential direction. That makes it possible to appropriately secure the joint strength between the bottom shell 10*c* and the mounting surface 18.

In the first embodiment, as an example, in each welding spot 23, the center of a welding width W2 is positioned on the circumference A that is present at a radius r [mm] from the center of the opening 19. At that time, the circumferential length C1 of the circumference A is equal to C1=2×π×r [mm], and the ratio of the welding length 12 of the welding spots 23 with respect to the circumferential length C1 of the circumference A is set to be approximately equal to 10 [%] (i.e., L2/C1≈0.1 holds true).

Moreover, in the first embodiment, the welding spots 23 are formed in such a way that the slit length L1 of the slits 21 is greater than the welding length L2. Thus, for example, each welding spot 23 is formed not to reach both ends of the corresponding slit 21. In other words, the slit length L1 is greater than the welding length L2 (i.e., L1>L2 holds true). As a result, at the time of performing welding at the welding spots 23, the electrode of the welding torch (not illustrated) during arc welding is prevented from colliding with the rim portion at both ends of the slits 21. That enables achieving improvement in the welding activity. Meanwhile, there is no restriction on the slit length 11 of the slits 21 according to the first embodiment. Thus, the slit length 11 can be set to be equal to the welding length 12, because of which the slits 21 get entirely covered by the welding spots 23.

As explained above, the welding spots 23 are formed through the slits 21 that are present at a distance from the opening 19 of the base member 12. Thus, the welding spots 23 are formed at a distance from the opening rim 19*a* of the opening 19. Hence, the portion 18*b* of the mounting surface 18 of the base member 12 can be secured on the inner diameter side as well as the outer diameter side of each welding spot 23 in a radial direction of the mounting surface 18 (i.e., in the direction of the welding width W2). At the time of forming the welding spots 23 via the slits 21, due to the heat applied during welding, the base member 12 undergoes deformation in the form of expansion around the welding spots 23. In that regard, in the first embodiment, the mounting surface 18 is kept intact around the welding spots 23 (the slits 21), Hence, the mounting surface 18 has high stiffness around the slits 21. Moreover, in the first embodiment, since the mounting surface 18 is kept intact around the slits 21 (the welding spots 23), the stress generated on the mounting surface 18 in the vicinity of the welding spots 23 due to the heat applied during welding is offset around the slits 21. For that reason, in the base member 12, the portion in the vicinity of the opening 19 is prevented from undergoing deformation along the opening rim 19*a* attributed to the heat applied onto the welding spots 23 during welding. That enables holding down deformation occurring in the portions between the neighboring welding spots 23 on the mounting surface 18 due to the heat applied during welding. As a result, at the time of welding, it becomes possible to prevent gaps from occurring between a bottom face 10*d* of the bottom shell 10*c* of the compressor main body container 10 and the mounting surface 18 of the base member 12. Consequently, it becomes possible to avoid the sympathetic vibration of the base member 12 that would occur in case gaps are formed between the compressor main body container 10. That enables holding down an increase in the noise attributed to the sympathetic vibration of the base member 12 accompanying the vibration of the compressor main body container 10.

Moreover, in the first embodiment, the bottom shell 10*c* makes contact with the rim portion of the opening 19 of the base member 12. Thus, the rim portion of the opening 19 of the base member 12 is pressed by the bottom shell 10*c*, which results in an increase in the strength around the rim portion of the opening 19 of the base member 12. Hence, it becomes possible to hold down deformation in the base member 12 attributed to the heat applied during welding. Moreover, because of the contact made by the bottom shell 10*c* with the rim portion of the opening 19 of the base member 12, it becomes possible to prevent the formation of a gap between the bottom shell 10*c* and the rim portion of the opening 19 of the base member 12. That enables avoiding vibration of the base member 12 that would occur in case gaps are formed in between the compressor main body container 10.

Furthermore, in the first embodiment, the welding spots 23 are formed to be raised above the rim portion on the outer periphery side of the slits 21, which are formed on the mounting surface 18, by about 1 [mm]. Thus, the welding spots 23 are formed to ensure that the rim portion of the slits 21 on the base member 12 are reliably linked to the bottom shell 10*c*. That results in an increased joint strength based on the welding, and enables holding down deformation of the base member 12 due to the heat applied during welding. Hence, it becomes possible to prevent the formation of gaps between the rim portion of the slits 21 of the base member 12 and the bottom shell 10*c*. That enables avoiding vibration of the base member 12 that would occur in case gaps are formed in between the compressor main body container 10.

Meanwhile, in the first embodiment, the welding spots 23 are formed to extend in an arc-like manner along the rim portion of the outer periphery side of the slits 21. Alternatively, for example, the welding spots 23 can be formed to extend in a linear manner while making contact with the rim portion of the slits 21.

In the first embodiment, the explanation is given about the case in which the welding spots 23 are formed by performing arc welding via the slits 21. However, the formation of the welding spots 23 is not limited to arc welding. Alternatively, the welding spots 23 can be formed according to a welding method that does not involve the slits 21. For example, the welding spots 23 can be formed by performing laser welding or projection welding. In the case of implementing a welding method that does not involve the slits 21, there is no need to form the slits 21 on the mounting surface 18 of the base member 12. Thus, as long as a plurality of welding spots 23 is formed in between the outer peripheral border 18*a* of the base member 12 and the opening rim 19*a* of the opening 19, it serves the purpose.

Comparison Between First Embodiment and Comparison Example

Figure 7:
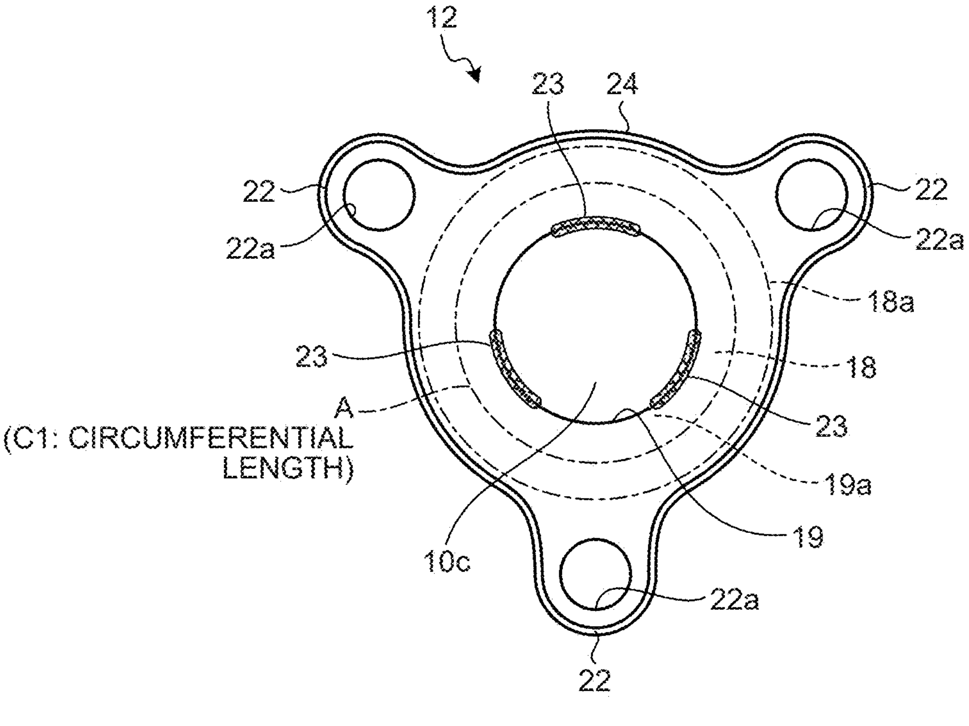
FIG. 7 is a planar view of a comparison example to be used for comparison with the welding spots according to the first embodiment.
Figure 8:
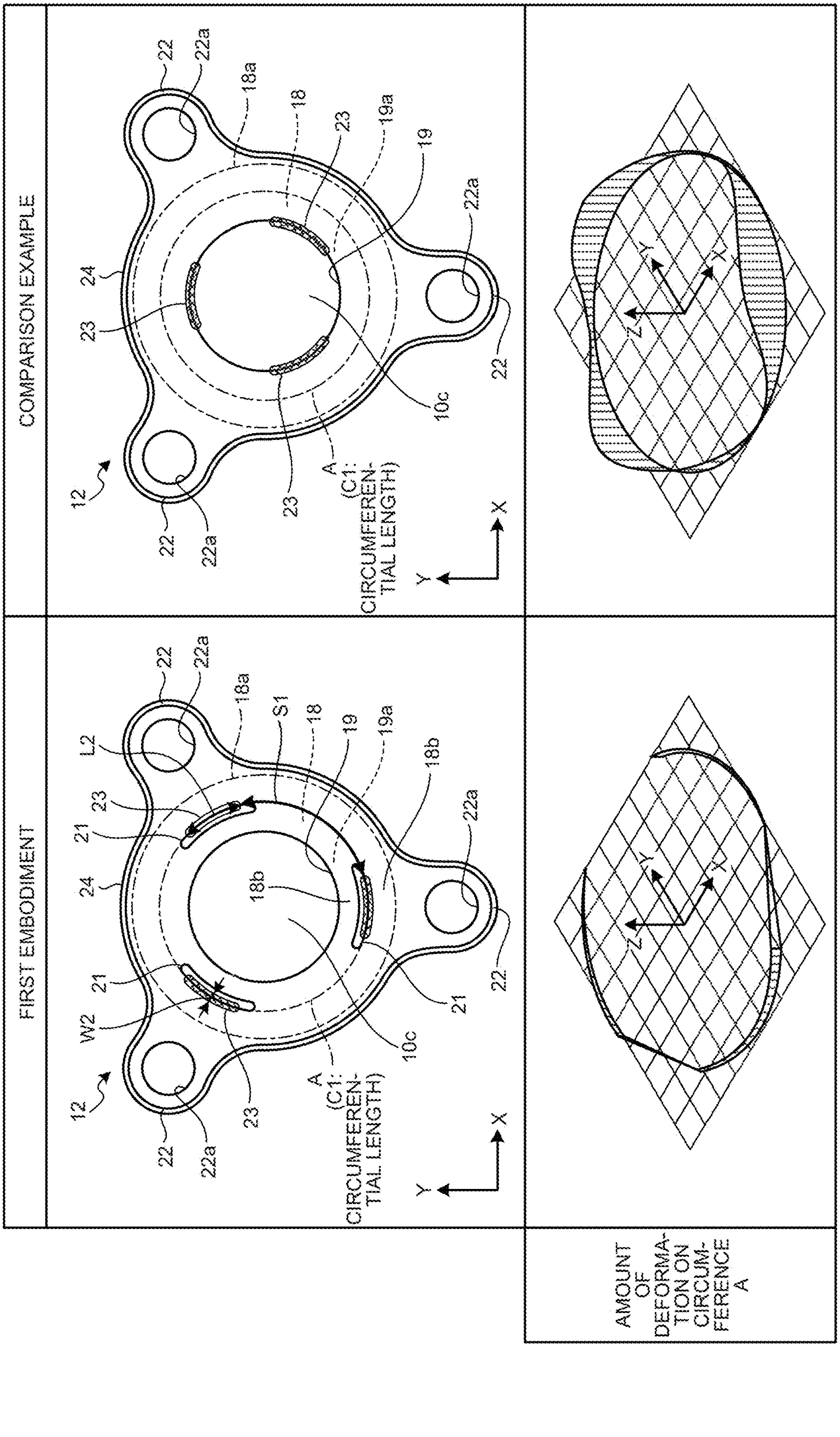
FIG. 8 is a diagram in which the amount of deformation occurring on a mounting surface before and after the welding is illustrated in the form of comparison between the first embodiment and the comparison example.
Figure 9:
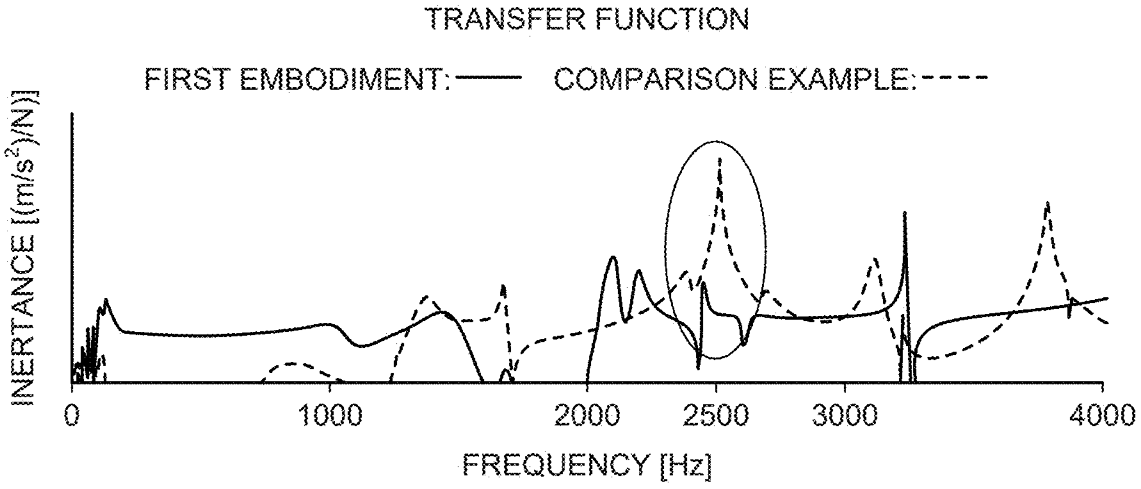
FIG. 9 is a diagram illustrating the comparison between the first embodiment and the comparison example regarding the variation in the inertance with respect to the frequency.

FIG. 7 is a planar view of a comparison example to be used for comparison with the welding spots 23 according to the first embodiment. FIG. 8 is a diagram in which the amount of deformation occurring in the portion positioned on the circumference A, which is at a certain distance of r [mm] from the center of the opening 19, on the mounting surface 18 of the base member 12 is illustrated in the form of comparison between the first embodiment illustrated in FIG. 6 and the comparison example illustrated in FIG. 7. Herein, the circumference A represents the circumference of the circle on which the rim portions of the outer periphery side of the slits 21 illustrated in FIG. 6 according to the first embodiment are positioned. FIG. 9 is a diagram illustrating the comparison between the first embodiment and the comparison example regarding the variation in the inertance with respect to the frequency.

As illustrated in FIG. 7, in an identical manner to the first embodiment, the three welding spots 23 according to the comparison example are formed to extend for a predetermined length in the circumferential direction of the opening 19. Moreover, the welding spots 23 according to the comparison example are formed to have the same welding length extending in the circumferential direction of the opening 19 as the welding length 12 of the welding spots 23 according to the first embodiment. However, as compared to the first embodiment in which the welding spots 23 are formed at a distance from the opening rim 19*a*, the comparison example differs in the way that the three welding spots 23 are formed along the opening rim 19*a* of the opening 19.

As illustrated in FIG. 8, in the first embodiment, upon comparing the deformation before and after the welding of the bottom shell 10*c* and the base member 12 (i.e., before and after the formation of the welding spots 23), there is almost no deformation, in the direction of the central axis, of that portion of the mounting surface 18 which is positioned on the circumference A present at the distance r [mm] from the center of the opening 19; and the deformation in the vicinity of the rim portion of the opening 19 in the base member 12 is sufficiently held down before and after the welding.

On the other hand, in the comparison example, upon comparing the deformation before and after the welding of the bottom shell 10*c* and the base member 12 (i.e., before and after the formation of the welding spots 23), that portion of the mounting surface 18 which is positioned on the circumference A present at the distance r [mm] from the center of the opening 19 is deformed in the direction of the central axis by an amount of deformation equal to or greater than thrice at a maximum as compared to the first embodiment. Moreover, in the comparison example, on the mounting surface 18 on the circumference A, there are sections that are significantly deformed in the direction of the rotation axis and there are sections having almost no deformation in the direction of the rotation axis. As a result, on comparison of the state before and after the welding, the mounting surface 18 of the base member 12 exhibits undulation. For that reason, if the welding spots 23 are formed along the opening 19 as explained in the comparison example, gaps can get easily formed between the bottom shell 10*c* and the mounting surface 18 of the base member 12.

In contrast to the comparison example, according to the first embodiment, when the welding spots 23 are formed in between the opening rim 19*a* of the opening 19 and the outer peripheral border of the mounting surface 18, it becomes possible to prevent any gaps from forming between the bottom shell 10*c* of the compressor main body container 10 and the mounting surface 18 of the base member 12 due to welding-induced deformation at the time of welding. Hence, in the first embodiment, it becomes possible to hold down the occurrence of vibration of the base member 12 attributed to the formation of gaps between the compressor main body container 10 and the base member 12.

In the following explanation, regarding the comparison between the first embodiment and the comparison example, the reason behind the occurrence of a significant difference in the amount of deformation before and after the welding as illustrated in FIG. 8 is studied. In the first embodiment as well as the comparison example, during the welding of the base member 12 and the bottom shell 10*c* (i.e., at the time of forming the welding spots 23), it is believed that the base member 12 undergoes deformation in the form of expansion around the welding spots 23 due to the heat applied during welding.

In the comparison example, since the welding spots 23 are formed along the opening 19, that portion of the base member 12 which is in the vicinity of the opening rim 19*a* of the opening 19 expands away from a particular welding spot 23 (for example, from a first welding spot 23) in the circumferential direction of the opening 19. Moreover, around a different welding spot 23 (for example, a second welding spot 23) too, that portion of the base member 12 which is in the vicinity of the opening rim 19*a* of the opening 19 expands away from the welding spot 23 (the second welding spot 23) in the circumferential direction of the opening 19. As a result, the base member 12 experiences a force from both welding spots 23 (the first welding spot 23 and the second welding spot 23), which are adjacent in the circumferential direction, in the direction of getting compressed toward an intermediate position between those two welding spots 23. Hence, the base member 12 creases at the intermediate position between the two welding spots 23, and it results in sagging of the mounting surface 18.

In contrast, in the first embodiment, as explained earlier, the mounting surface 18 is kept intact around the welding spots 23 (the slits 21). Hence, the mounting surface 18 has high stiffness around the slits 21. Moreover, in the first embodiment, since the mounting surface 18 is kept intact around the slits 21 (the welding spots 23), the stress generated on the mounting surface 18 in the vicinity of the welding spots 23 due to the heat applied during welding is offset around the slits 21. For that reason, in the base member 12 according to the first embodiment, it is estimated that the deformation in the form of sagging of the portions present between the neighboring welding spots 23 on the mounting surface 18 due to the heat applied during welding is held down.

A transfer function illustrated in FIG. 9 represents the response with respect to the excitation force at each frequency according to the first embodiment and the comparison example. In FIG. 9 is illustrated the distribution of the inertance at each frequency. Herein, the inertance represents the ratio of a force F [N] input to an object (excitation force) and an acceleration a[m/s$^2$] occurring in the object accompanying the input force; and is expressed as a/F[(m/s$^2$)]. Thus, having low inertance at a specific frequency indicates that a member having an excitation force applied thereon does not easily undergo sympathetic vibration at the excitation force of that specific frequency. On the other hand, having high inertance at a specific frequency indicates that the member is prone to undergo sympathetic vibration at the excitation force of that specific frequency. In FIG. 9, the vertical axis represents the inertance [(m/s$^2$)/N], and the horizontal axis represents the frequency [Hz]. Moreover, in FIG. 9, the first embodiment is represented using a solid line, and the comparison example is represented using a dashed line. Meanwhile, the experimental data illustrated in FIG. 9 was measured using the rotary compressor 1 in the state in which the accumulator 11 is attached to the compressor main body container 10 as illustrated in FIG. 1.

As illustrated in FIG. 9, in the first embodiment, in the vicinity of 2500 [Hz] as indicated by a portion enclosed in a circle, the inertance having a correlation with the noise is reduced to a greater level as compared to the comparison example. That enables holding down the sympathetic vibration occurring in the base member 12 accompanying the vibration of the compressor main body container 10.

Thus, as compared to the comparison example in which the welding spots 23 are formed along the opening rim 19*a* of the opening 19, in the first embodiment in which the welding spots 23 are formed in between the outer peripheral border 18*a* of the mounting surface 18 and the opening rim 19*a* of the opening 19, deformation occurring around the welding spots 23 due to the heat applied during welding can be held down, and the base member 12 and the bottom shell 10*c* in a contact state can be joined without any gaps therebetween. As a result, it can be said that the noise attributed to the sympathetic vibration of the base member 12 can be reduced. As an example, in the first embodiment, the noise attributed to the sympathetic vibration of the base member 12 in the vicinity of 2500 [Hz] is reduced to a greater extent as compared to the comparison example.

Effects of Embodiment

As explained above, in the rotary compressor 1 according to the first embodiment, in the center of the mounting surface 18 of the base member 12, the opening 19 is formed into which the central part of the bottom shell 10*c* is fit. The base member 12 is joined to the compressor main body container 10 using a plurality of welding spots 23 formed after every interval S1 in the circumferential direction of the opening 19. The welding spots 23 are formed to extend for a predetermined length in the circumferential direction of the opening 19, and are positioned in between the outer peripheral border 18*a* of the mounting surface 18 and the opening rim 19*a* of the opening 19. As a result, portions of the mounting surface 18 are secured on both sides of the welding spots 23 in a radial direction of the mounting surface 18. Hence, the deformation occurring in the base member 12 due to the heat applied during welding is held down using the stiffness of the base member 12 itself. Particularly, in the first embodiment, the mounting surface 18 is kept intact around the welding spots 23 (the slits 21), so that the stress generated on the mounting surface 18 in the vicinity of the welding spots 23 due to the heat applied during welding is offset around the slits 21. That enables holding down the deformation of the mounting surface 18. For that reason, that portion of the base member 12 which is positioned on the inner periphery side of the slits 21 on the mounting surface 18 can be joined with the bottom shell 10*c* in a contact state and without any gaps therebetween. As a result, the sympathetic vibration of the base member 12 accompanying the vibration of the compressor main body container 10 can be held down, and the occurrence of the noise attributed to the sympathetic vibration of the base member 12 can be held down.

Moreover, in the rotary compressor 1 according to the first embodiment, the mounting surface 18 of the base member 12 is formed along the bottom shell 10*c* of the compressor main body container 10, and makes contact with the contact face 10*ca*1 of the bottom shell 10*c*. As a result, it becomes possible to prevent the formation of gaps between the bottom shell 10*c*, which is placed on the mounting surface 18, and the mounting surface 18; and the vibration occurring in the base member 12 can be held down. Moreover, in the first embodiment, the opening rim 19*a* of the opening 19 of the base member 12 makes contact with the bottom shell 10*c*. As a result, the opening rim 19*a* of the opening 19 of the base member 12 is pressed by the bottom shell 10*c*, which results in an increase in the mechanical strength around the rim portion of the opening 19 of the base member 12. Hence, it becomes possible to hold down deformation in the base member 12 attributed to the heat applied during welding. Moreover, it becomes possible to prevent the formation of gaps between the bottom shell 10*c* and the rim portion of the opening 19 of the base member 12. That enables avoiding vibration attributed to the sympathetic vibration of the base member 12.

Furthermore, in the base member 12 of the rotary compressor 1 according to the first embodiment, when the welding width W2 of each welding spot 23 is set as the width of the welding spot 23 in the direction orthogonal to the direction of the welding length 12 (the circumferential direction) (i.e., in a radial direction), and when the circumference A is set as the circumference passing through the center of the welding width W2 and running along the circumferential direction of the opening 19; the welding length 12 of each welding spot 23 represents the ratio equal to or greater than 5 [%] with respect to the circumferential length C1 of the circumference A. That makes it possible to appropriately secure the joint strength attributed to the welding spots 23.

Moreover, in the base member 12 of the rotary compressor 1 according to the first embodiment, a plurality of welding spots 23 is formed along the same circumference passing through the portion between the outer peripheral border 18*a* of the mounting surface 18 and the opening rim 19*a* of the opening 19 (i.e., formed along the circumference A). As a result, the portions 18*b* of the mounting surface 18 are secured on both sides of the welding spots 23 in a radial direction of the mounting surface 18. Hence, the deformation occurring in the base member 12 due to the heat applied during welding is held down using the stiffness of the base member 12 itself. For that reason, the base member 12 and the bottom shell 10*c* can be joined without any gaps therebetween. As a result, the sympathetic vibration of the base member 12 can be held down in an effective manner, and the occurrence of the noise attributed to the sympathetic vibration of the base member 12 can be held down in an effective manner.

Furthermore, in the base member 12 of the rotary compressor 1 according to the first embodiment, a plurality of slits 21 extending in the circumferential direction of the opening 19 is formed through the mounting surface 18 at intervals on the circumference A that runs along the circumferential direction of the opening 19. Then, the welding spots 23 are formed via the slits 21 and make contact with the rim portion of the slits 21. With that, it becomes possible to enhance the joint strength attributed to the welding spots 23.

Moreover, in the base member 12 of the rotary compressor 1 according to the first embodiment, the slit width W1 of each slit 21 in the direction orthogonal to the circumferential direction of the opening 19 (i.e., in a radial direction of the opening 19) is equal to or greater than 1.5 times the thickness T of the mounting surface 18 of the base member 12 (i.e., $W1 \leq 1.5 \times T$ holds true). As a result, when the electrode of a welding torch (not illustrated) is moved closer to the contact portions between the bottom shell 10*c* and the mounting surface 18 of the base member 12 via the slits 21, the electrode of the welding torch can be prevented from colliding with the rim portion of the slits 21. That makes the manufacturing easier.

Furthermore, in the base member 12 of the rotary compressor 1 according to the first embodiment, the slit length L1 in the circumferential direction of the opening 19 is greater than the welding length L2 for which each welding spot 23 extends in the circumferential direction of the opening 19 (i.e., $L1 > L2$ holds true). As a result, when the electrode of a welding torch (not illustrated) is moved closer, it becomes possible to prevent collision of the electrode of the welding torch with the rim portion of the slits 21. For that reason, the welding spots 23 can be appropriately formed to ensure that the mounting surface 18 of the base member 12 is linked to the bottom shell 10*c*. Hence, the base member 12 and the bottom shell 10*c* can be joined while maintaining the state of mutual contact, and the joint strength attributed to the welding spots 23 can be enhanced.

Moreover, in the base member 12 of the rotary compressor 1 according to the first embodiment, each welding spot 23 is formed to make contact with at least either the rim portion on the inner periphery side or the rim portion on the outer periphery side of the corresponding slit 21. As a result, the base member 12 and the bottom shell 10*c* can be joined in the state of mutual contact and without any gaps therebetween, and the joint strength attributed to the welding spots 23 can be enhanced.

Given below is the description of other embodiments with reference to the accompanying drawings. In the other embodiments, the identical portions and the identical constituent elements to the first embodiment are referred to by the same reference numerals.

Second Embodiment

Figure 10:
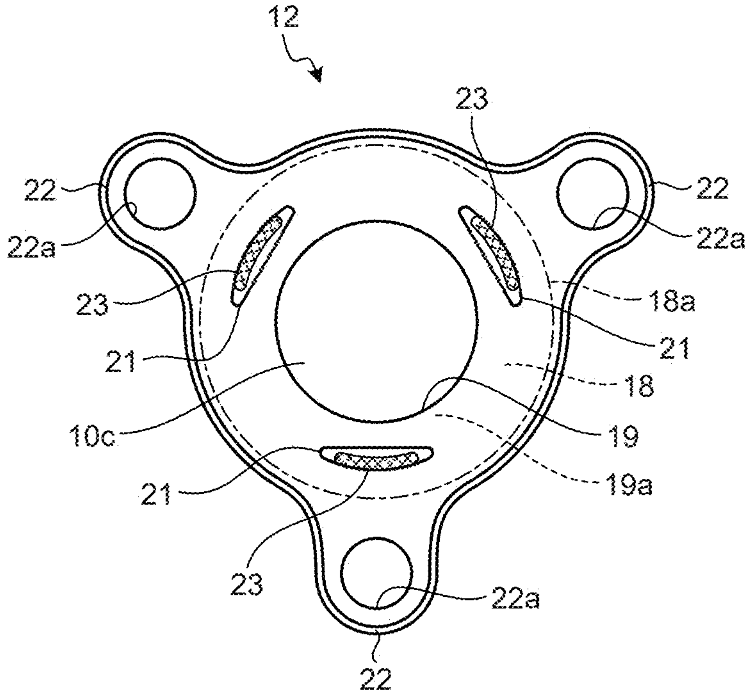
FIG. 10 is a planar view of the welding spots formed on the base member according to a second embodiment.
Figure 11:
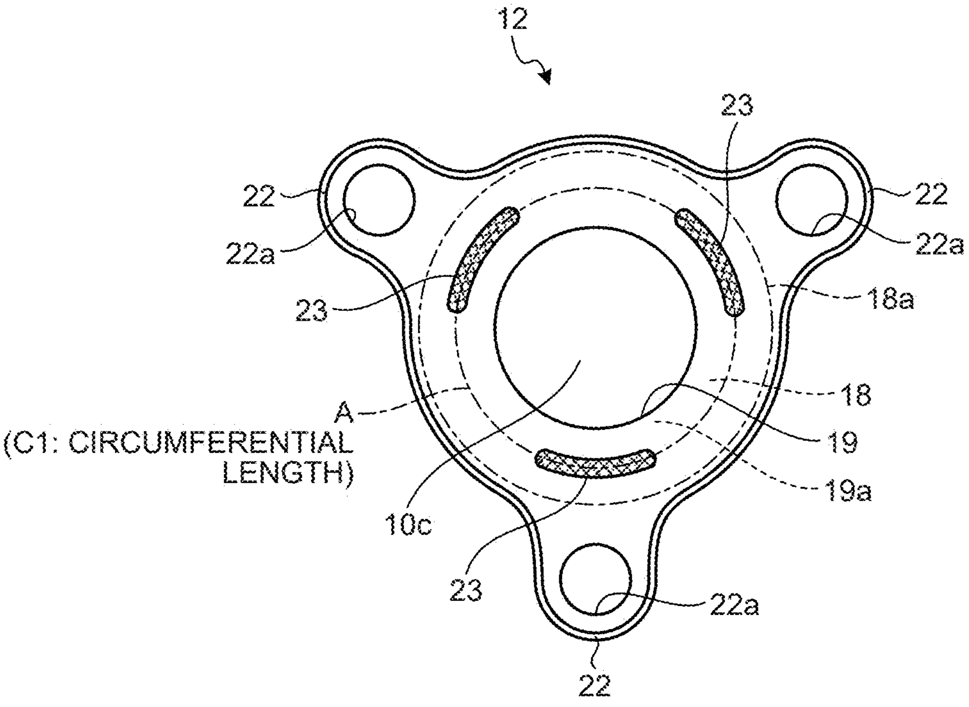
FIG. 11 is a planar view of the welding spots formed on the base member according to a third embodiment.

FIG. 10 is a planar view of the welding spots 23 formed on the base member 12 according to a second embodiment. FIG. 11 is a planar view of the welding spots 23 formed on the base member 12 according to a third embodiment. In the second and third embodiments, the positions at which the welding spots 23 are formed in the slits 21 are different than the positions according to the first embodiment.

In the second embodiment, the slits 21 formed on the base member 12 have, what is called, a semicircular cross-sectional surface (hog-backed shape) that includes an arc-like rim portion on the outer periphery side and a linear rim portion on the inner periphery side. The arc on the outer periphery side of the slits 21 has, for example, a smaller curvature than the curvature of the circumference A running along the circumferential direction of the opening 19. The straight line running along the rim portion on the inner periphery side of the slits 21 is parallel to a straight line tangent to the circumference A.

As illustrated in FIG. 10, the welding spots 23 according to the second embodiment are formed along the rim portion on the outer periphery side of the slits 21, from among the rim portion on the outer periphery side and the rim portion on the inner periphery side of the slits 21. Moreover, the welding spots 23 are formed to bridge over the rim portion on the outer periphery side of the slits 21 on the mounting surface 18 and the bottom shell 10*c* that is exposed from the slits 21. As a result, at the time of performing arc welding via the slits 21, the welding spots 23 can be appropriately formed to ensure that the base member 12 and the compressor main body container 10 are linked together. Hence, the base member 12 and the bottom shell 10*c* can be joined in the state of mutual contact and without having any gaps therebetween. Moreover, since the welding spots 23 are formed along the rim portion on the outer periphery side of the slits 21, at the time of welding (i.e., at the time of forming the welding spots 23), the electrode of a welding torch (not illustrated) can be smoothly moved closer to the contact portions between the bottom shell 10*c* of the compressor main body container 10 and the mounting surface 18 of the base member 12. That makes the manufacturing easier.

In the second embodiment too, in an identical manner to the first embodiment, the welding spots 23 are positioned in between the outer peripheral border 18*a* of the mounting surface 18 and the opening rim 19*a* of the opening 19. Hence, at the time of welding, it becomes possible to hold down the deformation of the portions present between the neighboring welding spots 23 in the circumferential direction of the opening 19, For that reason, at the time of welding, it becomes possible to prevent the formation of gaps between the bottom face 10*d* of the bottom shell 10*c* and the mounting surface 18 of the base member 12, thereby enabling holding down the sympathetic vibration of the base member 12 accompanying the vibration of the compressor main body container 10.

Third Embodiment

As illustrated in FIG. 11, each welding spot 23 is formed to bridge over the rim portion on the inner periphery side and the rim portion on the outer periphery side of the corresponding slit 21 in a radial direction of the mounting surface 18, and is formed across both ends of the corresponding slit 21 in the circumferential direction of the opening 19. That is, the welding spots 23 are formed to cover the entire slits 21.

In the second and third embodiments too, in an identical manner to the first embodiment, a plurality of welding spots 23 is formed to extend for a predetermined welding length 12 in the circumferential direction of the opening 19, and is positioned in between the outer peripheral border 18*a* of the mounting surface 18 and the opening rim 19*a* of the opening 19. Hence, at the time of welding, it becomes possible to hold down the deformation in the portions present between the neighboring welding spots 23 in the circumferential direction of the opening 19. As a result, the sympathetic vibration of the base member 12 accompanying the vibration of the compressor main body container 10 can be held down, and the noise attributed to the sympathetic vibration of the base member 12 can be held down.

Fourth Embodiment

Figure 12:
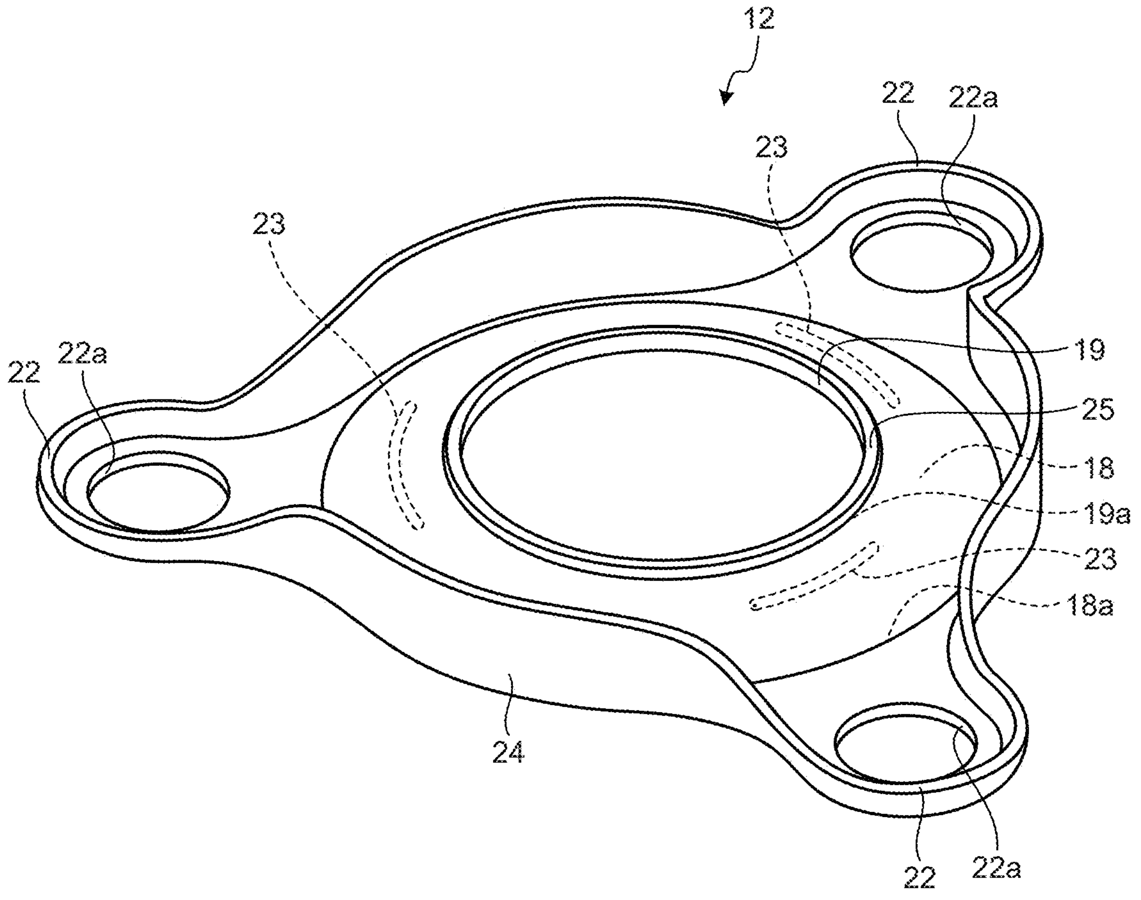
FIG. 12 is a bottom perspective view of the base member according to a fourth embodiment.

FIG. 12 is a bottom perspective view of the base member 12 according to a fourth embodiment. In the fourth embodiment, the slits 21 are not formed on the mounting surface 18 of the base member 12; an inner-periphery-side rising portion 25 is formed on the opening rim 19*a* of the opening 19 of the base member 12; and the welding spots 23 are formed by welding the base member 12 and the bottom shell 10*c* according to a welding method not involving slits (for example, according to projection welding or laser welding). Apart from that, the fourth embodiment is identical to the first embodiment.

As illustrated in FIG. 12, on the opening rim 19*a* of the opening 19 of the base member 12 according to the fourth embodiment, the inner-periphery-side rising portion 25 that is tubular in shape is formed in an integrated manner by performing, for example, burring. The inner-periphery-side rising portion 25 protrudes toward the opposite side of the bottom face 10*d* of the bottom shell 10*c*, so that the inner-periphery-side rising portion 25 does not come into contact with the bottom face 10*d* of the bottom shell 10*c*. As a result of forming the inner-periphery-side rising portion 25, the base member 12 has an increased stiffness in the vicinity of the opening rim 19*a* of the opening 19. Hence, it becomes possible to further hold down the deformation occurring in the portions present between the neighboring welding spots 23 in the circumferential direction of the opening 19 due to the heat applied during welding.

Moreover, in the base member 12 according to the fourth embodiment, for example, the welding spots 23 can be formed according to a plurality of projection welding instances. Hence, instead of forming the slits 21, for example, a plurality of salient portions (not illustrated) meant for enabling the formation of the welding spots 23 can be formed at the positions of the welding spots 23 and on the side on which the bottom shell 10*c* of the mounting surface 18 comes into contact. Thus, in the case of forming the welding spots 23 according to projection welding, a plurality of salient portions (not illustrated) meant for enabling the formation of the welding spots 23 can be formed on the bottom face 10*d* of the bottom shell 10*c* of the compressor main body container 10.

Meanwhile, in the first to fourth embodiments, although the explanation is given about an example in which three welding spots 23 are formed; the number of welding spots 23 is not limited to three, and four or more welding spots 23 can also be formed.

REFERENCE SIGNS LIST

1 rotary compressor (sealed compressor)
10 compressor main body container
11 accumulator
12 base member
14 Compressing section
15 motor
18 mounting surface
18*a* outer peripheral border
19 opening
19*a* opening rim
21 slit
23 welding spot
25 inner-periphery-side rising portion
A circumference (circle)
C1 circumferential length
L1 slit length
L2 welding length
W1 slit width
W2 welding width

The invention claimed is:

1. A sealed compressor comprising:

a compressor main body container that is vertically cylindrical in shape;

a compressing section that is placed inside the compressor main body container and that compresses a refrigerant; and a motor that is placed inside the compressor main body container and that drives the compressing section, wherein the sealed compressor further comprises a base member that is welded to the compressor main body container and that supports the compressor main body container, the compressor main body container includes a bottom shell, the base member includes a mounting surface on which the bottom shell is mounted and which is in contact with the bottom shell, at center of the mounting surface, an opening is formed into which central part of the bottom shell is fit, the base member is joined to the bottom shell by a plurality of welding spots formed at intervals in circumferential direction of the opening, and the plurality of welding spots are formed to extend for a predetermined length in circumferential direction of the opening and are positioned in between outer peripheral border of the mounting surface and opening rim of the opening, and when welding length L2 [mm] represents length of arc joining both ends of the welding spot along the circumferential direction, and when circumferential length C1 [mm] represents circumferential length of circumference overlapping with the arc, the welding length L2 and the circumferential length C1 of each of the plurality of welding spots satisfy $$L2/C1 \geq 0.05.$$

2. The sealed compressor according to claim 1, wherein the plurality of welding spots are placed on same circumference along circumferential direction of the opening.

3. The sealed compressor according to claim 1, wherein in the base member, a plurality of slits is formed to extend through the mounting surface and in circumferential direction of the opening, and the welding spots are formed via the slits and make contact with rim portion of the slits.

4. The sealed compressor according to claim 3, wherein when W1 represents slit width of each of the plurality of slits in orthogonal direction to circumferential direction of the opening, and when base member thickness T represents thickness of the mounting surface of the base member, the slit width W1 [mm] and the base member thickness T [mm] satisfy $$W1 \geq 1.5 \times T.$$

5. The sealed compressor according to claim 3, wherein when slit length L1 [mm] represents length of arc joining both ends of the slit along the circumferential direction, and when welding length L2 [mm] represents length of arc joining both ends of the welding spot along the circumferential direction, the slit length L1 of each of the plurality of slits and the welding length L2 of each of the plurality of welding spots satisfy $$L1 > L2.$$

6. The sealed compressor according to claim 3, wherein each of the plurality of welding spots is formed to be raised above at least either rim portion of inner periphery side or rim portion of outer periphery side of the corresponding slit.

7. The sealed compressor according to claim 1, wherein opening rim of the opening of the base member makes contact with the bottom shell.

8. The sealed compressor according to claim 1, wherein the mounting surface is formed along the bottom shell and makes contact with the bottom shell.

9. The sealed compressor according to claim 1, wherein, on opening rim of the opening of the base member, a tubular rising portion, which protrudes toward opposite side of the bottom shell, is formed.

10. The sealed compressor according to claim 1, wherein each of the plurality of welding spots are formed in an arc shape along the circumferential direction of the opening.

11. The sealed compressor according to claim 2, wherein the mounting surface of the base member and the bottom shell are in contact with each other across the circumferential direction.

* * * * *